US008386100B1

(12) United States Patent
Lie

(10) Patent No.: US 8,386,100 B1
(45) Date of Patent: Feb. 26, 2013

(54) AIRCRAFT FLIGHT EVENT DATA INTEGRATION AND VISUALIZATION

(75) Inventor: Simon Lie, Bothell, WA (US)

(73) Assignee: The Boeing Company, Chicago, IL (US)

( * ) Notice: Subject to any disclaimer, the term of this patent is extended or adjusted under 35 U.S.C. 154(b) by 602 days.

(21) Appl. No.: 12/485,514

(22) Filed: Jun. 16, 2009

(51) Int. Cl.
*G05D 1/10* (2006.01)

(52) U.S. Cl. ............ 701/14; 244/75.1; 340/988; 434/35

(58) Field of Classification Search .................... 701/14; 244/75.1; 345/419, 653, 664, 679, 7, 8, 9; 340/988; 434/35; *G05D 1/10*
See application file for complete search history.

(56) References Cited

U.S. PATENT DOCUMENTS

| | | | | |
|---|---|---|---|---|
| 4,792,906 | A * | 12/1988 | King et al. | 701/5 |
| 6,314,363 | B1 * | 11/2001 | Pilley et al. | 701/120 |
| 6,393,358 | B1 * | 5/2002 | Erzberger et al. | 701/120 |
| 7,650,232 | B1 * | 1/2010 | Paielli | 701/528 |
| 7,848,698 | B2 * | 12/2010 | Batcheller et al. | 434/2 |
| 7,925,393 | B2 * | 4/2011 | Bolt et al. | 701/10 |
| 8,046,119 | B2 * | 10/2011 | Bitar et al. | 701/14 |
| 8,060,239 | B2 * | 11/2011 | Hoffmann et al. | 700/193 |
| 8,065,044 | B2 * | 11/2011 | Jump et al. | 701/11 |
| 8,131,406 | B2 * | 3/2012 | Morris et al. | 701/3 |
| 8,150,623 | B2 * | 4/2012 | Bitar et al. | 701/467 |
| 8,160,755 | B2 * | 4/2012 | Nichols et al. | 701/3 |
| 8,161,399 | B2 * | 4/2012 | Kannan et al. | 715/764 |
| 8,175,763 | B2 * | 5/2012 | Yamane et al. | 701/16 |
| 8,200,377 | B2 * | 6/2012 | Marty et al. | 701/3 |
| 2003/0195672 | A1 * | 10/2003 | He | 701/3 |
| 2005/0283281 | A1 * | 12/2005 | Hartmann et al. | 701/4 |
| 2006/0097895 | A1 * | 5/2006 | Reynolds et al. | 340/961 |
| 2009/0109065 | A1 * | 4/2009 | Pinheiro | 340/971 |
| 2009/0319100 | A1 * | 12/2009 | Kale et al. | 701/4 |

OTHER PUBLICATIONS

Charles J. Minard, Chart of Napoleon's Invasion of Russia, Nov. 20, 1869.

Wood et al. *Aircraft Accident Investigation*. 1995. Endeavor Books. Casper, Texas, pp. 127-138.

* cited by examiner

*Primary Examiner* — Tuan C. To

(74) *Attorney, Agent, or Firm* — Hope Baldauff Hartman LLC

(57) ABSTRACT

Concepts and technologies described herein provide for the integration of flight event parameters with time and location data to provide a geographic visualization of a flight path and associated parameters. According to various aspects, a geographic area that encompasses a flight path according to location data associated with the aircraft is rendered on a display device. The location data is then transformed into a representation of the flight path on the rendering of the geographic area. One or more parameters associated with an event that occurred while the aircraft was in flight are retrieved and correlated with the location data to determine the location along the flight path in which the event occurred, and a representation is provided on the flight path to illustrate the exact geographic location in which it occurred.

20 Claims, 12 Drawing Sheets

AIRCRAFT FLIGHT EVENT DATA INTEGRATION AND VISUALIZATION

BACKGROUND

Aircraft, ship, train, and other vehicle accidents or incidents (hereinafter "incidents") often provide investigative challenges in light of the immense quantity of potential factors that may have contributed to the incident. For example, for any given aircraft incident, there may be numerous or several contributing factors, including but not limited to aircraft mechanical, electrical, and/or software systems and components; pilot, maintenance technician, air traffic control personnel, and other human elements; weather and other environmental factors; and bird strikes and other foreign object damage. Most often, it turns out to be a number of these and other factors that combine in such a way as to cause the incident.

Moreover, for many of these potential contributing factors, there are multiple sources of data that need to be analyzed by an investigation team to determine if and how these factors contributed to the incident, either alone or when combined with other factors. For example, flight data recorders have the capability to simultaneously record thousands of aircraft system parameters as the flight progresses; cockpit voice recorders record conversations between the flight crew, as well as other sounds within the cockpit; radar systems within air traffic control record radar data corresponding to aircraft location and movement during the flight; and weather radar and satellite imagery provides imagery associated with weather and environmental conditions within the area of the flight and corresponding incident.

Traditionally, investigation teams analyze the volumes of data and attempt to build temporal relationships between various factors to aid in determining the cause of the incident. As an example, investigators may create a two-dimensional plot with the horizontal axis representing time and one or more data parameters plotted with respect to the vertical axis, such as airspeed, altitude, heading, or others. In doing so, the investigation team can visualize any correlations between parameters at any given time. For example, the team may plot a particular flight control input along the same two-dimensional timeline with airspeed and heading. Using the plot, the team could visualize a correlation between a particular flight control input at a given time with an unexpected heading and airspeed change at the same time, potentially indicating a flight control problem.

A problem with utilizing two-dimensional plots to visualize relationships between parameters is the large and ever-increasing quantity of data available for analysis. Flight data recorders are continuously increasing in recording and storage capabilities, which provides increasingly large quantities and types of parameters that may be useful in an incident investigation. However, only a limited number of parameters can be included on a traditional plot at any given plotted time if the plot is to remain readable and useful. Moreover, while providing a visual relationship between parameters with respect to time, the conventional two-dimensional plots do not provide a means for visualizing geographical relationships that depict where certain event parameters occurred during a flight.

Another method for visualizing correlations between parameters that may contribute to an incident is to use the collected parameters along with radar and other geographic location data to create a simulation of the aircraft en route for a period of time prior to the incident. For example, an investigation team analyzing an aircraft crash may be able to use data from a flight data recorder and ground radar data to re-create the aircraft flight from point A to point B. The re-creation may be an animated depiction of the aircraft flying over the terrain encountered on the flight path, showing the aircraft maneuver at the appropriate times in the appropriate manner according to the data collected by the flight data recorders and other data sources.

While the animated simulations are valuable tools in that they allow investigators to visualize the aircraft movements at times and locations encountered prior to the incident, the animations are limited in the amount of data that can be shown at any given time. The animations show the resulting movement of the aircraft without necessarily showing why the aircraft moved as it did. For example, a person viewing an animation may be able to determine that the aircraft turned to the left at a particular time and/or location, but could not determine that the turn was due to a specific deflection amount of the ailerons, rudder, elevator, and/or asymmetric engine thrust. Moreover, animations do not allow a viewer to simultaneously view parameters at multiple locations and times prior to an incident since they are limited to seeing only a single instance in time as the aircraft travels toward the incident.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for the integration of flight event parameters with time and location data to provide a geographic visualization of the aircraft flight path and associated parameters. According to one aspect, location data corresponding to a location of an aircraft at various time instances during a flight is retrieved. A rendering of a geographic area that encompasses the flight according to the location data is provided. The location data is then transformed into a representation of the flight path on the map or rendering of the geographic area.

A parameter associated with a flight event that occurred at some time and location along the flight path is retrieved and correlated with the location data to determine the location along the flight path in which the event occurred. A representation of this parameter is then provided on the flight path to illustrate the exact geographic location in which it occurred. Any number of parameters may be selectively represented on the geographic representation of the area encompassing the flight path to show where they occurred.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
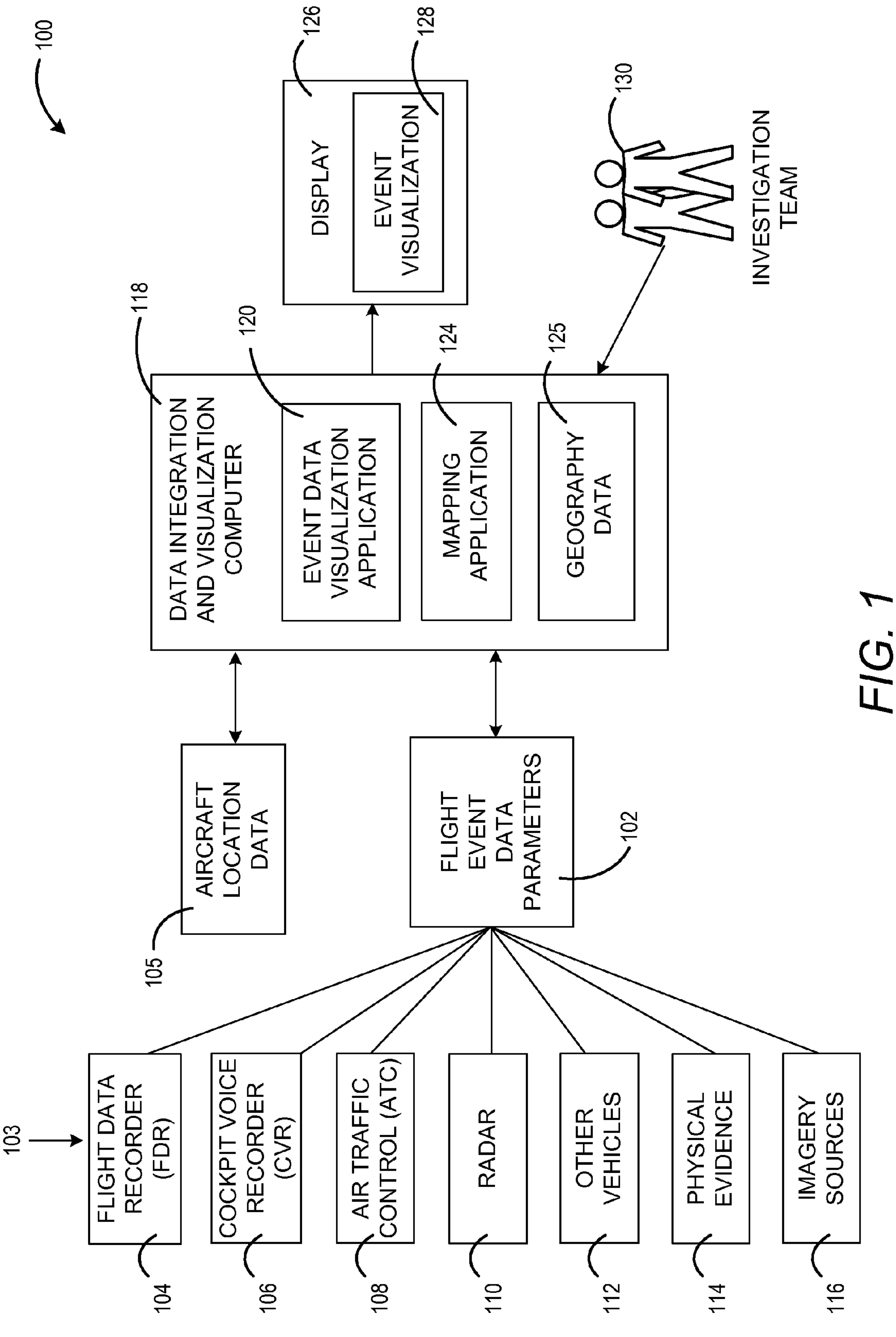
FIG. 1 is a block diagram of an aircraft flight event data integration and visualization system 100 according to various embodiments described herein.

The following detailed description is directed to concepts and technologies for providing for the integration and visualization of flight event data. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As discussed above, aircraft flight incidents may involve multiple factors including, but not limited to, any number of aircraft system transitions or system malfunctions, operator or maintainer actions or errors, environmental conditions, or a combination thereof. Visualizing the temporal and spatial relationships between numerous parameters that could have contributed to an incident is an extremely difficult task.

Utilizing the concepts and technologies described herein, an unlimited number of flight event data parameters can be selectively represented on a flight path displayed on a map of the applicable geographical area. In doing so, any number of parameters can be visually depicted along the flight path at the corresponding locations at which they occurred, and at the precise time during the flight that they occurred. This allows a person or group of people to rapidly intake large amounts of data corresponding to the events that transpired prior to an incident, and to more easily correlate parameters to identify potential cause and effect relationships that may have contributed to the incident. Moreover, as will be described below, the map may be zoomed in and out to add, remove, or change the parameters rendered along the flight path.

In the following detailed description, references are made to the accompanying drawings that form a part hereof, and which are shown by way of illustration, specific embodiments, or examples. The following disclosure and the accompanying figures describe the various embodiments in the context of an aircraft incident investigation in which an aircraft flew along a particular flight path until one or more events resulted in an accident or other incident. Because the concepts described below allow for a visualization of a large number of parameters that may affect the flight characteristics of an aircraft, the corresponding embodiments are particularly useful when investigating the cause of an incident. However, it should be appreciated that these concepts may also be applied to any aircraft flight or other flight operation that does not result in an incident.

Referring now to the drawings, in which like numerals represent like elements through the several figures, integrating flight event data for temporal and spatial visualization according to the various embodiments will be described. FIG. 1 shows a block diagram illustrating an aircraft flight event data integration and visualization system 100 according to various embodiments described herein. As an overview to the process taken by the aircraft flight event data integration and visualization system 100, the system 100 collects flight event data parameters 102 from a number of flight event data sources 103, retrieves geography data 125 corresponding to the location of the aircraft flight and incident, and integrates the collected data into an event visualization 128 rendered on a display 126 for an investigation team 130.

A "flight event" in the context of this disclosure may include any occurrence or instance of a measured flight event data parameter 102. A "flight event data parameter," utilizing an aircraft flight and incident example to illustrate the various embodiments, may include any pilot or automated command, input or action; aircraft system activity; aircraft movement or maneuver; recorded conversation; a combination or relationship between events; and any other recordable occurrence that takes place during the aircraft flight that can be correlated with a time or location of the aircraft. For example, a flight event data parameter 102 could include, but is not limited to, the deflection of a control surface, the measurable quantity of thrust of a particular engine or combination of engines, the activation of a switch, the recorded speech associated with a crew member or air traffic controller, a weather phenomenon, or a flight characteristic such as speed, altitude, heading, pitch, roll, yaw, or a measurable change in any flight characteristic.

The flight event data parameters 102 are collected from a number of flight event data sources 103. These data sources may include any number and type of devices and/or persons that store data corresponding to flight events while the aircraft is en route. For example, as seen in FIG. 1, the flight event data sources 103 include a flight data recorder (FDR) 104, a cockpit voice recorder (CVR) 106, air traffic control (ATC) 108, radar sources 110 such as airport radar, other vehicles 112 such as other aircraft in the area, physical evidence 114 collected at the incident site or anywhere along the flight path or flight origination location, and imagery sources 116 such as satellite imagery and cameras used by an investigation team 130. It should be understood that any type of stored data that can be associated with a particular time or location associated with the applicable aircraft flight, including data collected by the investigation team 130 after the incident and input into a database or computer system, may be utilized to create flight event data parameters 102 that are plotted on the event visualization 128 in the manner described below. It should also be appreciated that the flight event data parameters 102 may be stored in a single data repository or may be stored in any number of separate computer systems or other repositories.

The collected flight event data parameters 102 will ultimately be utilized by an event data visualization application 120 residing on a data visualization and integration computer to create the event visualization 128. However, before plotting the desired flight event data parameters 102, the event data visualization application creates a representation of a flight path overlaid onto a map of the geographic area that encompasses the aircraft flight and site of the incident. This process and the resulting event visualization will be shown and described in detail below with respect to FIGS. 2-9. To create the map or geographical representation of the flight and associated areas according to one embodiment, the event data visualization application 120 instructs a mapping application 124 to provide the applicable geographical representation of the area of interest. The mapping application retrieves the applicable geography data 125 and creates the requested map.

Mapping applications that are generally known provide a user with a visualization of a geographic area that is highly customizable in the level of detail shown and the various ways in which the user may zoom in and out and otherwise alter the view perspectives with relative ease. For example, GOOGLE EARTH and GOOGLE MAPS mapping services (hereinafter "GOOGLE mapping services") of Google, Inc. may be utilized to provide the underlying geographical representation of the applicable flight area. GOOGLE mapping service allows a user to utilize a menu to select and deselect layers of detail for display. Roads, buildings, borders, and weather features may be turned on and off according to the level of detail desired. Moreover, satellite imagery may be utilized to provide a photographical representation of the area. As will be described in greater detail below with respect to FIG. 7, utilizing GOOGLE mapping services or other mapping applications, a user may zoom into or out of the geographical representation to reveal or hide information corresponding to flight events.

According to various embodiments, the GOOGLE mapping services additionally allow a user to shift viewing perspectives by using a cursor and on-screen controls to raise and lower the altitude of the view perspective; shift the view perspective left, right, forward, and backward; rotate the view perspective; tilt the view perspective up and down; or any combination thereof. In doing so, the rendered flight path and all displayed flight event representations are modified accordingly as described below. While GOOGLE mapping services are discussed throughout this disclosure as being the mapping service to display the flight event information in the manner described below, it should be appreciated that any mapping applications or services may be utilized with the embodiments described herein to provide the geographical representation and corresponding levels of detail and view manipulation capabilities.

Moreover, it should be appreciated that the event data visualization application 120 and the mapping application may be a single application (or group of applications) programmed to integrate the flight event data parameters 102 with a flight path representation and geographical representation of the applicable area to create the event visualization 128 in the manner described herein. The integration of the flight event data with the mapping services will be discussed in greater detail below. Additionally, while the flight event data integration and visualization system 100 is shown to include a single data integration and visualization computer 118 that executes the event data visualization application 120 and the mapping application 124, according to other embodiments, the mapping application 124 and/or the event data visualization application 120 reside on remote computers communicatively linked via any type of network.

In order to create an accurate representation of the flight path of the aircraft prior to the incident, the event data visualization application 120 retrieves aircraft location data 105 that represents the precise three-dimensional geographical coordinates of the aircraft at any number of time instances throughout the duration of the flight. The aircraft location data 105 may be derived from global positioning system (GPS) data stored on the FDR 104, from radar sources 110, from imagery sources 116, from inertial based data stored on the FDR 104 or elsewhere, from any other applicable aircraft instrumentation data stored on the FDR 104, or any combination thereof. Utilizing the aircraft location data 105, which may indicate the latitudinal and longitudinal position and altitude of the aircraft at any given time instance during the flight, the event data visualization application 120 can plot the flight path representation on the geographical representation, or map, of the applicable area to create the event visualization 128.

The event visualization 128 is rendered on a display 126, such as those utilized with conventional desktop and laptop computers, projectors, televisions, cellular telephones, personal data assistants, and others. As discussed below, any number of flight event data parameters can then be represented on the flight path representation according to time and/or location of the event occurrence to provide a complete visualization of the interaction between parameters and flight characteristics.

Figure 2:
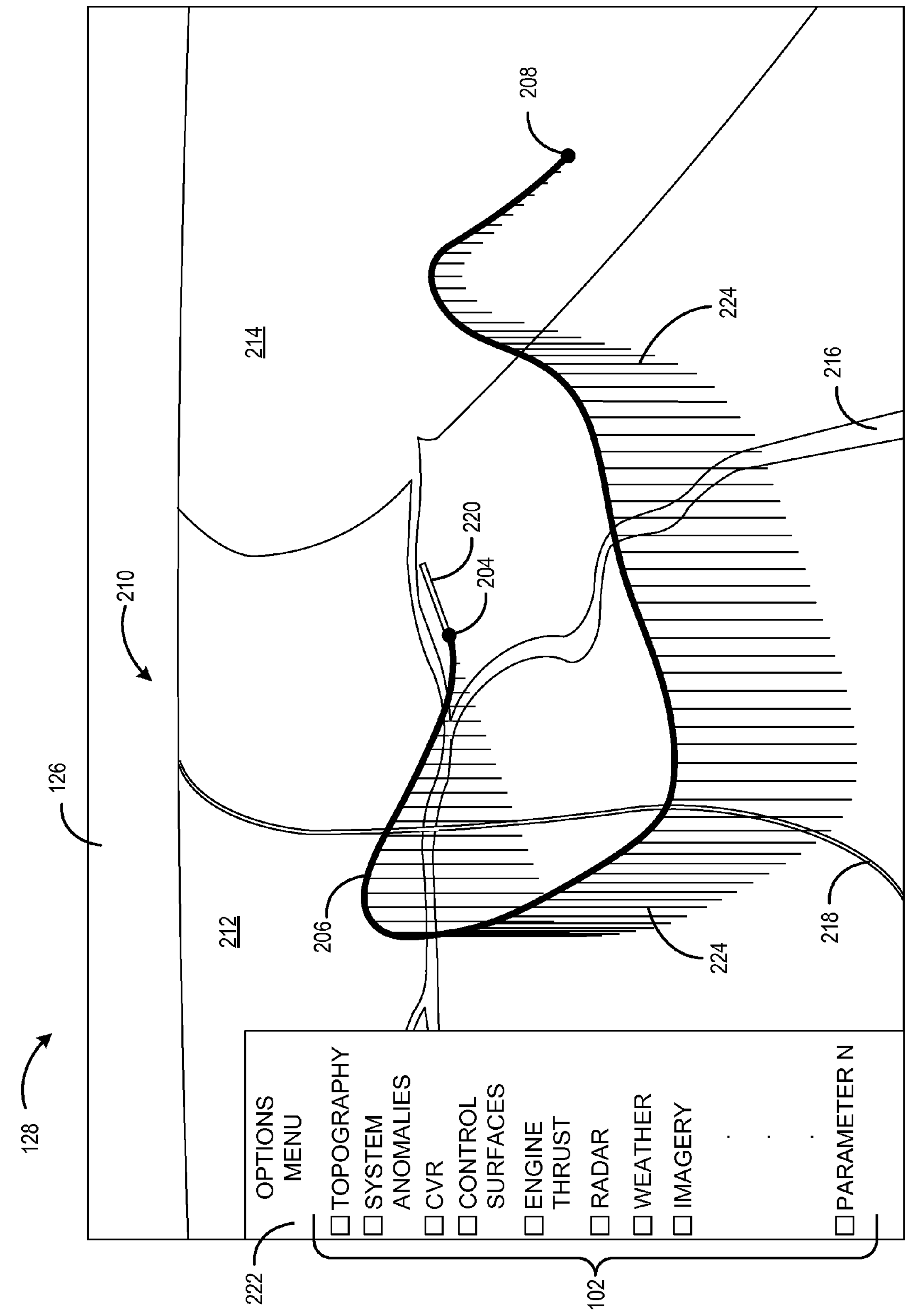
FIGS. 2-5, 6A, 6B, 6C, 7, and 8 are screen diagrams of an illustrative event visualization according to various embodiments presented herein.

Turning now to FIG. 2, an illustrative event visualization 128 will be described. As mentioned above, the event visualization 128 is the end product created by the event data visualization application 120 that may be manipulated in the various ways described herein to assist an investigation team or others in determining the causes of an incident. In manipulating the event visualization 128, any number of flight event data parameters 102 may be visualized at the precise location and time within the flight path 206 in which the corresponding event occurred. By visualizing these parameters in this manner, the investigation team 130 can identify cause and effect relationships between parameters and the aircraft movements to aid in determining the cause of the incident.

An illustrative example of an aircraft incident will be used to illustrate the various embodiments of FIGS. 2-8. According to this example, an aircraft takes off from starting location 204, flies along the illustrated flight path 206 to an incident site 208, where the aircraft ditches in the ocean 214. The flight path 206 is rendered on a map or geographical representation 210 of the area encompassing the flight path 206.

As discussed above, the geographical representation 210 is created by the mapping application 124 using the applicable geography data 125, and may include any number of terrain features, including but not limited to land 212, ocean 214, rivers 216, mountains (not shown), or any other topography associated with the area of the incident. Moreover, the geographical representation 210 may include any number and type of man-made structures and features, including but not limited to roads 218, airports 220, buildings (not shown), towers (not shown), and any other landmarks or applicable features. The level of detail shown may be customized so that only the features desired, or categories of feature, are shown at any given time.

According to the embodiment shown, an Options Menu 222 provides a number of available customization check boxes that allow a user to select the level of detail associated with the geographical representation 210, or to select a flight event data parameter 102 for display in connection to the flight path 206 as described below. For example, the user may select the "Topography" check box to provide additional topographical details of the area shown. For clarity purposes, only minimal details with respect to the geographical representation 210 have been shown in the various figures; however, it should be understood that very detailed topographical features may be displayed in connection to the event visualization 128, to include the use of colors, shading, labels, and three-dimensional renderings of any applicable landmarks or other features. Each of the available parameters shown in the Options Menu 222 may have a drop-down menu selector that, when selected by the user, provides any number of additional selectable display options associated with that particular parameter or category of parameters.

As stated above, the event data visualization application 120 provides a representation of the flight path 206 taken by the aircraft from the starting location 204 to the incident site 208. The vertical lines extending from the flight path 206 to the ground are altitude indicators 224 that provide the investigation team 130 or other viewer with a way to quickly visualize the altitude of the aircraft during all phases of the flight. The length of the altitude indicators 224 is proportional to the altitude above ground level at that specific position in which each altitude indicator 224 intersects the ground. If desired, the event data visualization application 120 can include textual labels at intervals along the flight path 206 to provide more detailed information as to the actual altitude values at one or more locations and times during the flight. As will become clear in the description and figures below, any type and quantity of data can be displayed on the event visualization quickly and easily through the selection of options within the Options Menu 222 or other menus or keyboard and input device shortcuts.

Figure 3:
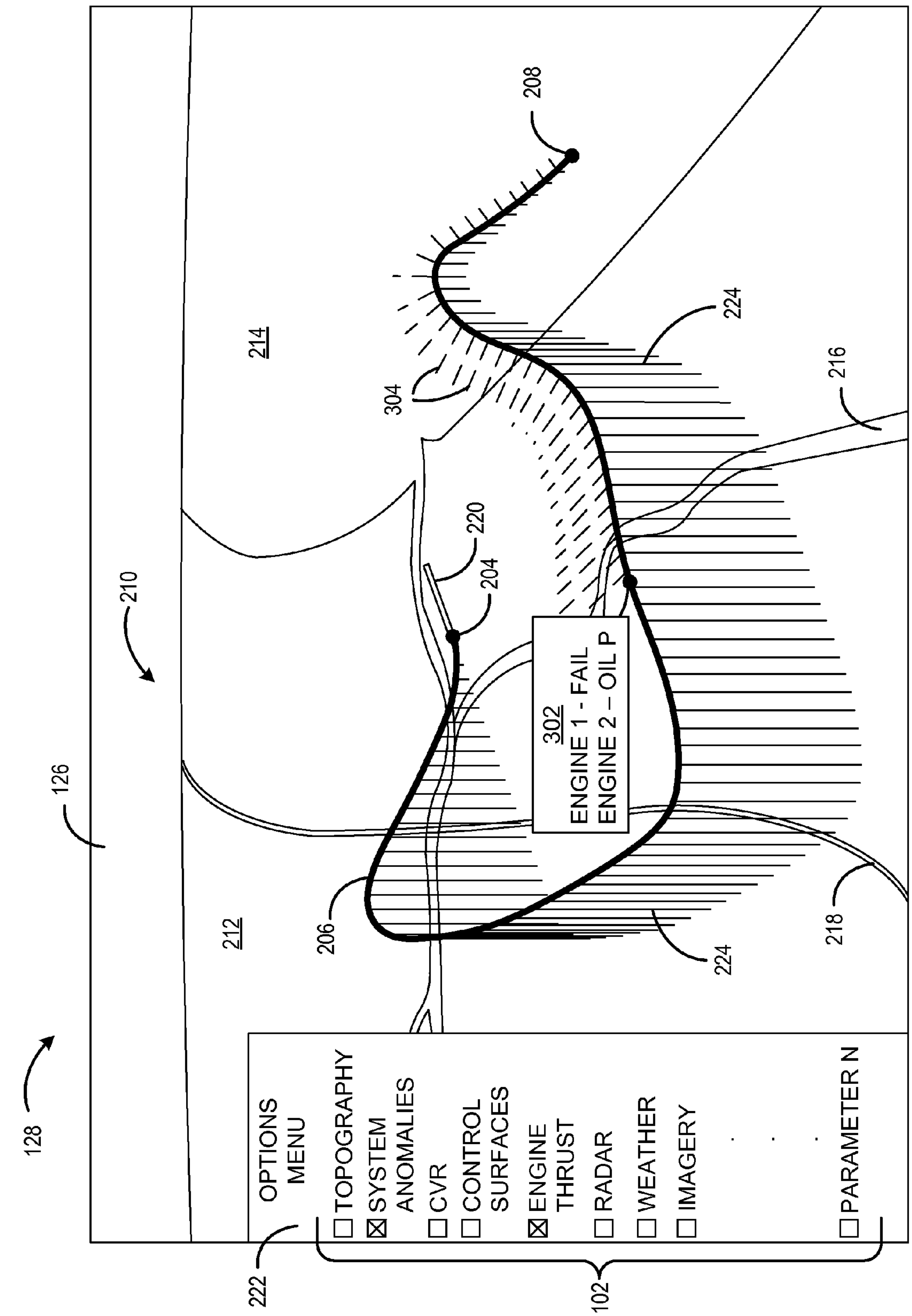

Looking at FIG. 3, additional flight event data parameters 102 have been selected for display on the event visualization 128. According to this example, a "system anomalies" selection option has been provided in the Options Menu 222. This flight event data parameter 102 actually represents to a collection of the flight event data parameters 102 that correspond to any aircraft system malfunction, failure, or other anomaly. According to this embodiment, the event data visualization application 120 has been programmed with computer-readable instructions to, upon receiving a selection of this option in the Options Menu 222, transform event data from any recorded system anomaly into a representation of the anomaly on the flight path 206 at the geographic location that the anomaly event occurred. As seen in FIG. 3, the engine malfunction indicator 302 shows the geographic location at which all thrust was lost from engine 1 due to complete engine failure and at which partial thrust was lost from engine 2 associated with an loss in oil pressure. The event data corresponding to system anomalies may be located in the FDR 104 according to specific fault tags associated with the data, or may be collected, stored in a data repository, and tagged as anomaly data by the investigation team 130 or other application or computer system.

It should be appreciated that the system anomalies selection in the Option Menu 222 is just one example of a type of grouping or collection of flight event data parameters that may be selectively rendered on the event visualization 128. The event data visualization application 120 may be programmed to aggregate or filter event data for visualization in any desired manner. Moreover, as described above, the system anomalies option and any other flight event data parameter 102 selection option within the Option Menu 222 may include a drop-down menu that enables the user to selectively choose one or more flight event data parameters 102 from the category. For example, while only the engine malfunction indicator 302 is shown for clarity purposes in FIG. 3 with the system anomaly option selected, with an actual aircraft crash scenario, there could be numerous system anomalies that are rendered on the flight path 206 as a result of the selection of the general system anomalies option. Should the user select a drop-down menu associated with the system anomalies option, the specific anomalies associated with particular aircraft systems may be individually selected or deselected to show or hide each parameter, respectively, as desired.

In addition to the system anomalies selection in the Option Menu 222, the engine thrust option has also been selected. As a result, the event data visualization application 120 has transformed the engine thrust data from the FDR 104 into a visual representation of the thrust asymmetry with the thrust asymmetry indicators 304. The length of these lines are proportional to the difference in thrust between the left engine, which is engine 1 that experienced the failure in this example, and the right engine, pointing in the direction of the lower thrust engine. As seen in this example, just after the engine failure or malfunction was recorded as indicated on the flight path 206 by the engine malfunction indicator 302 a relatively large thrust asymmetry is recorded, which is represented at the appropriate geographic location on the flight path 206 by the thrust asymmetry indicators 304. The thrust asymmetry indicators 304 extend 90 degrees to the left of the flight path 206 as traveling toward the incident site 208 since the operating engine on the right side of the aircraft creates a yawing moment toward the inoperative or malfunctioning engine on the left side of the aircraft.

These indicators are longer closest to the location marked by the engine malfunction indicator 302 at which the thrust loss event occurred and the thrust asymmetry event was initiated. As the aircraft began a turn to the right, toward the operating engine, the thrust asymmetry indicators 304 shorten and continue to shorten until the aircraft crashes at the incident site 208. This shortening of the thrust asymmetry indicators 304 may be attributed to the pilot reducing the power of the operating engine in order to assist in the turn to the right and ultimately reducing the power completely as the aircraft ditches into the ocean 214.

The advantages of the event visualization 128 over traditional two-dimensional plots and even animations should be clear. Looking at FIG. 3, a person can instantly visualize the geographic location of the aircraft from beginning to end, including altitude and heading changes. System anomalies and other flight event data parameters 102 can be integrated into or removed from the event visualization 128 through a single click of a mouse or other input device. Not only does the representation of the flight event data parameters 102 provide for a geographical visualization of where and when during the flight that the even occurred, but also provides extensive information corresponding to the events that can be quickly deciphered at a glance by the person viewing.

For example, as described above, the thrust asymmetry indicators 304 show not only that a difference in thrust between engines occurred, but also where and when it occurred by the placement of the indicators on the flight path 206, what direction the induced yawing moment was directed, the severity of the thrust asymmetry at any given location on the flight path 206 from the length of the indicator line at that location, and the changes in the thrust asymmetry condition from the location at which the condition began until the aircraft incident from viewing the changing lengths of the indicator lines along the flight path 206. By correlating this information with the flight path 206, any potential effect of the thrust asymmetry condition on the aircraft's flight path 206 can be instantly visualized. As will become clear in the description below with respect to FIGS. 4-7, any number of additional flight event data parameters 102 can be rendered on the aircraft flight path 206 to explore different relationships between various parameters in order to further investigate potential causes of the aircraft mishap and validate or dispel theories as to the identification of contributing factors to the incident.

It should be understood that while the figures are shown in black and white, embodiments disclosed herein may utilize any number of colors to visually distinguish flight event data parameters 102 and any other features of the event visualization 128. In addition, multiple colors and shading may be used to represent a single flight event data parameter 102 in order to provide additional information corresponding to the particular parameter. For example, in FIG. 3, the thrust asymmetry indicators 304 may vary in color instead of or in addition to varying in length to indicate various amounts of differential thrust. Moreover, utilizing colors to represent related flight event data parameters 102 that have distinguishable and notable features can be a useful tool. As an unrelated example, the total fuel quantity can be represented on a flight path to show the quantity of fuel remaining at various locations during the flight, with the individual fuel quantities of each tank displayed as a separate color to highlight any fuel flow issues from any particular tank.

Figure 4:
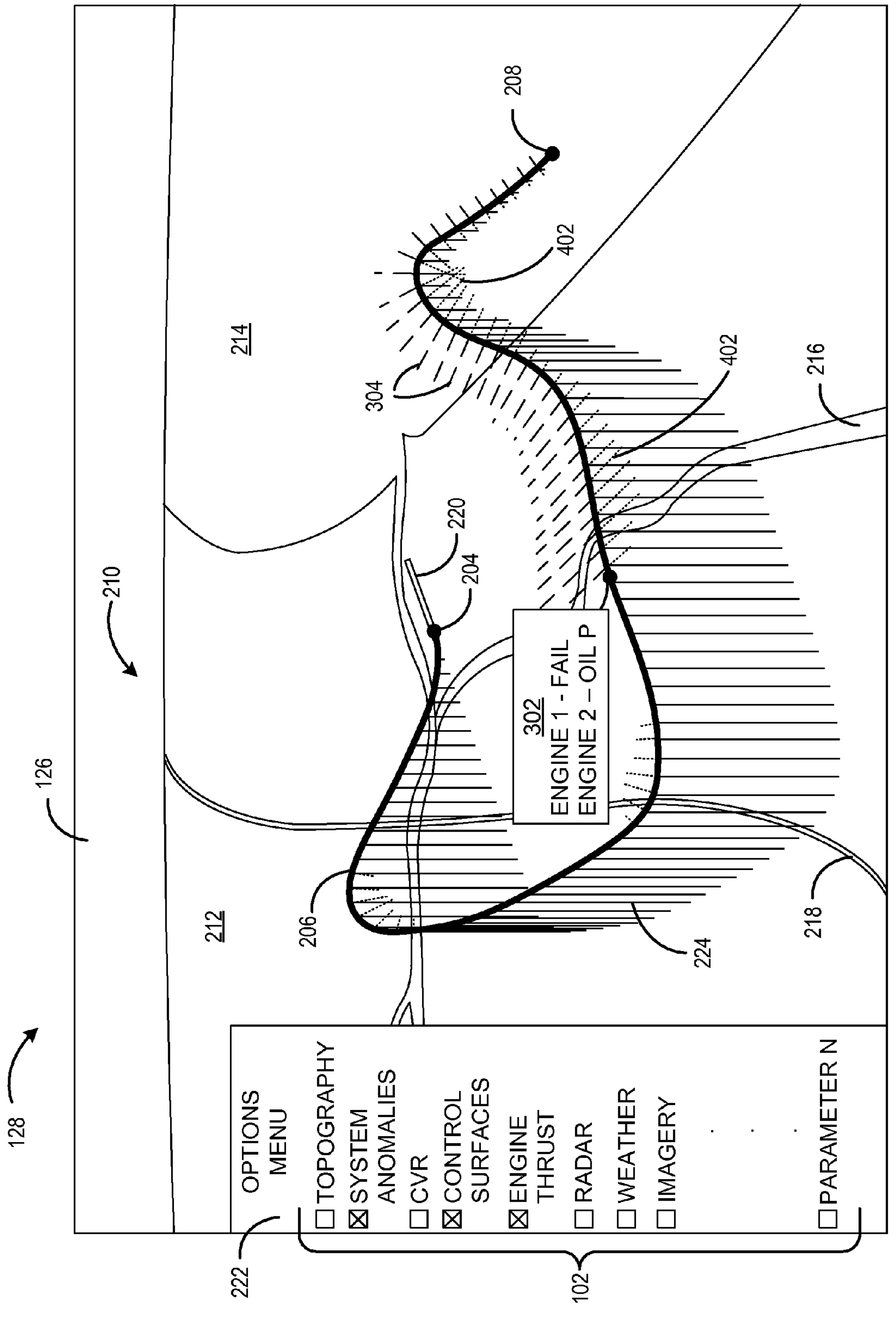

Looking now at FIG. 4 and continuing the illustrative example described above, a member of the investigation team 130 has now selected the control surfaces option from the Options Menu 222. For simplicity, assume that the event data visualization application 120 has been programmed to transform control wheel deflection data from the FDR 104 into representations of the control wheel deflection on the event visualization 128 upon user selection of the control surfaces option from the Options Menu 222. According to other embodiments, selection of the control surfaces option may result in representations of control input and/or deflection of the ailerons, flaps, rudder, elevator, and or any other control surfaces such as spoilers. Alternatively, a drop-down menu associated with the control surfaces option in the Options Menu 222 may allow for individual selections of each various control surface options.

Upon receiving a selection of the control surfaces option from the Options Menu 222, the event data visualization application 120 displays the control wheel deflection indicators 402 corresponding to the various locations on the flight path 206 in which the control wheel was deflected. The direction of the indicators illustrates the direction of the control wheel deflection. For example, the pilot or autopilot commanded left wheel during the first coordinated left turn after takeoff, followed by another left wheel deflection in the second left turn, followed by a right wheel after the engine thrust event to counter the counter-clockwise yawing moment induced by the asymmetrical engine thrust. Similar to varying length of the thrust asymmetry indicators 304 described above, the length of the control wheel deflection indicators 402 is proportional to the degree of deflection or control input provided to the control wheel. The visualization of the control wheel deflections during the aircraft flight appropriately corresponds to the asymmetrical thrust problem encountered, but may or may not have any causal relationship to the aircraft incident. Being able to turn this visualization on and off as desired, along with all other flight event data parameters 102, provides the investigation team with a valuable tool that aids in this decision-making process.

Figure 5:
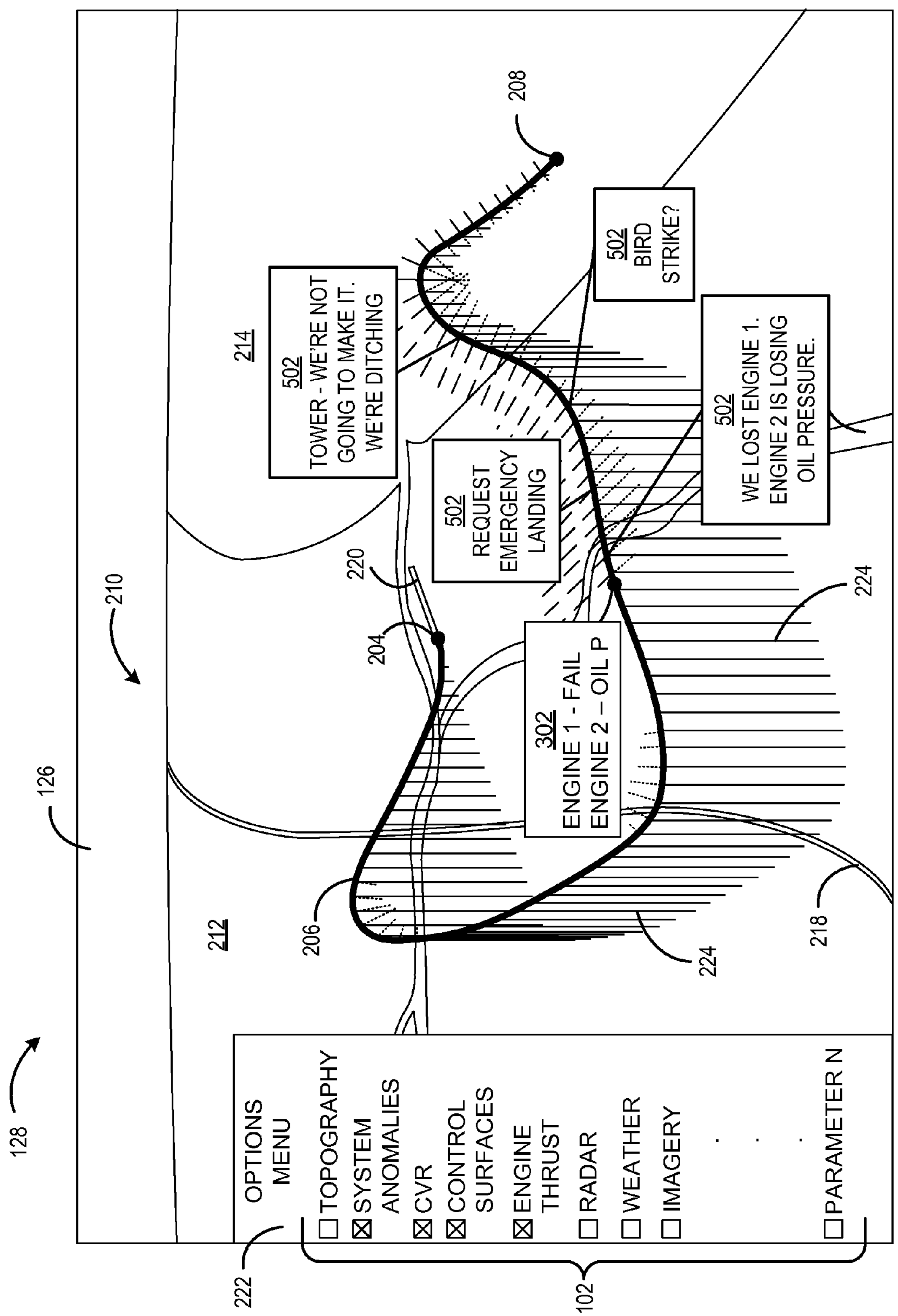

FIG. 5 shows the event visualization 128 with the CVR 106 transcripts inserted at the locations in the flight path 206 at which they occurred. For clarity, only a few key statements from the pilot or co-pilot have been included. It can be readily seen from this event visualization 128 the exact location where a problem was encountered, the resulting thrust asymmetry, the control input utilized to control the aircraft, the speculation by the pilots that a bird strike occurred, and the location where the decision was made by the pilot to ditch the aircraft rather than attempt a return to the airport 220.

According to various embodiments described herein, all recorded data, including the aircraft location data 105 and all data associated with the flight event data parameters 102 can be stored with a time stamp according to the time that the corresponding event or location determination occurred. These time stamps not only assist the event data visualization application 120 in correlating each event with the location data 105 to determine where along the flight path 206 to represent the corresponding event occurrence, but also enable the investigation team 130 to elect to have the time associated with the events represented on the event visualization 128. Moreover, the event data visualization application 120 may provide a dynamic visualization, as shown and described herein with respect to FIGS. 6A-6C, that fluidly represents the changing geographic locations of any number of flight event data parameters 102 with respect to the flight path 206 and/or the surrounding area within the geographic representation 210 as time advances within a selected time period.

Figure 6A:
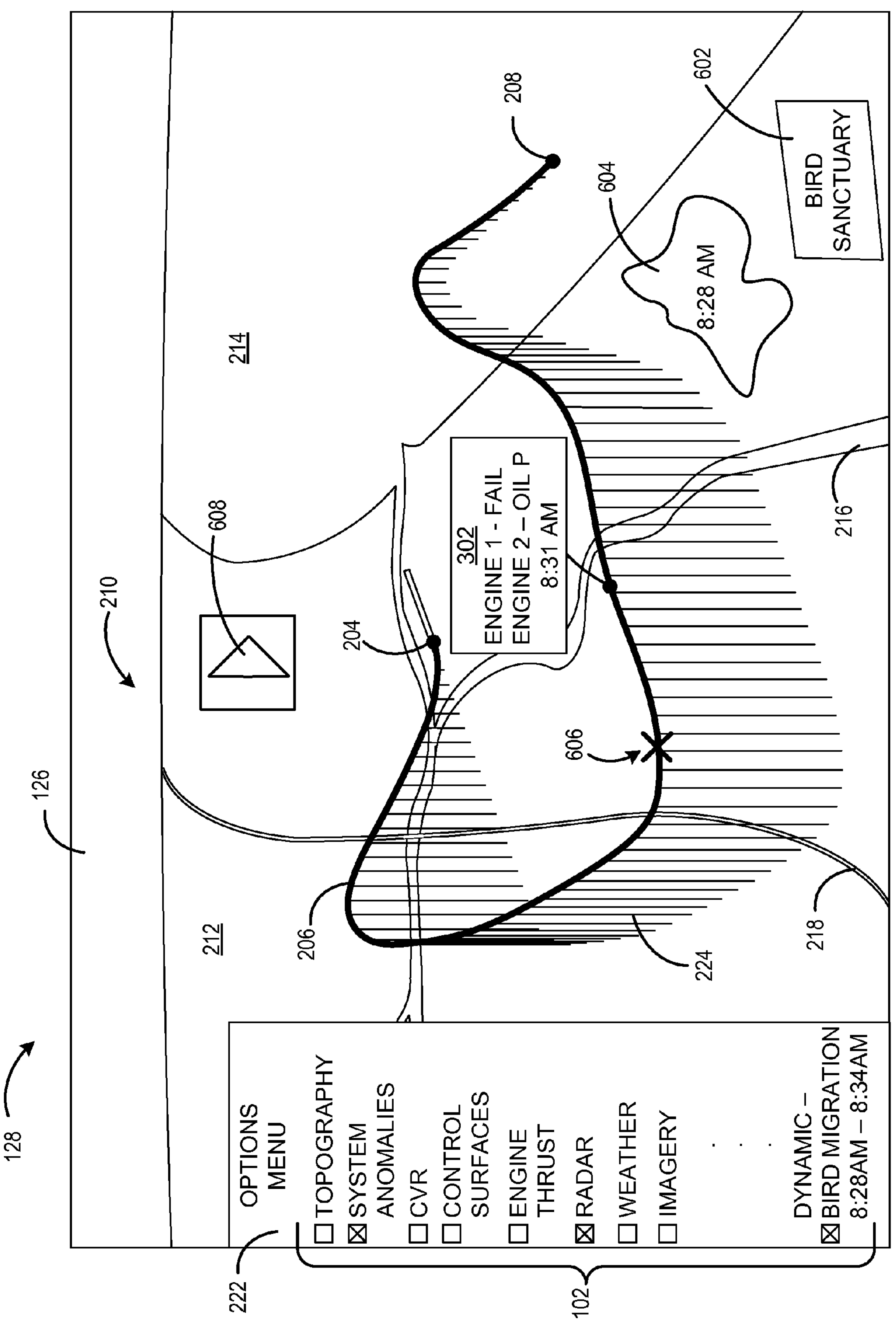
Figure 6B:
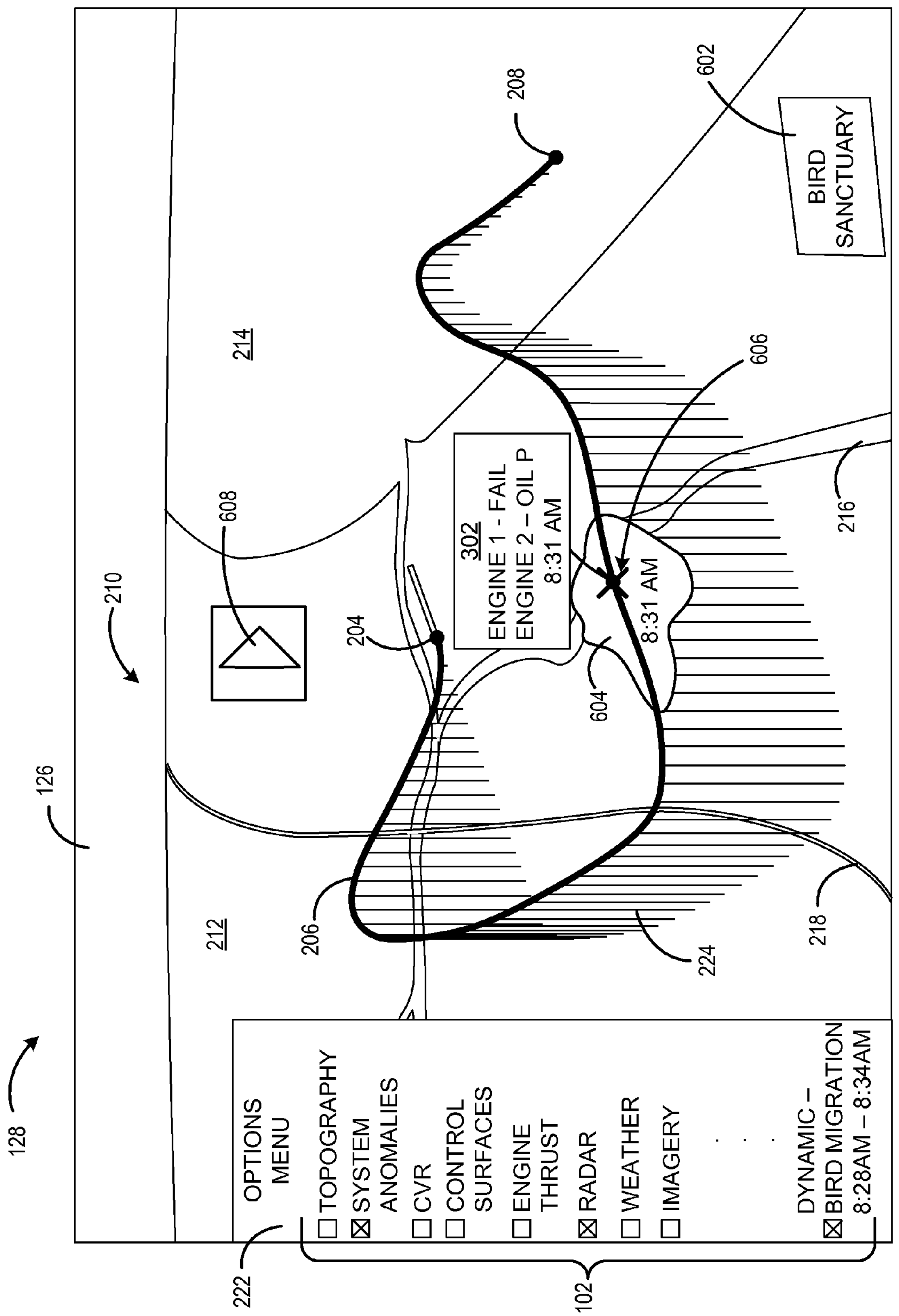
Figure 6C:
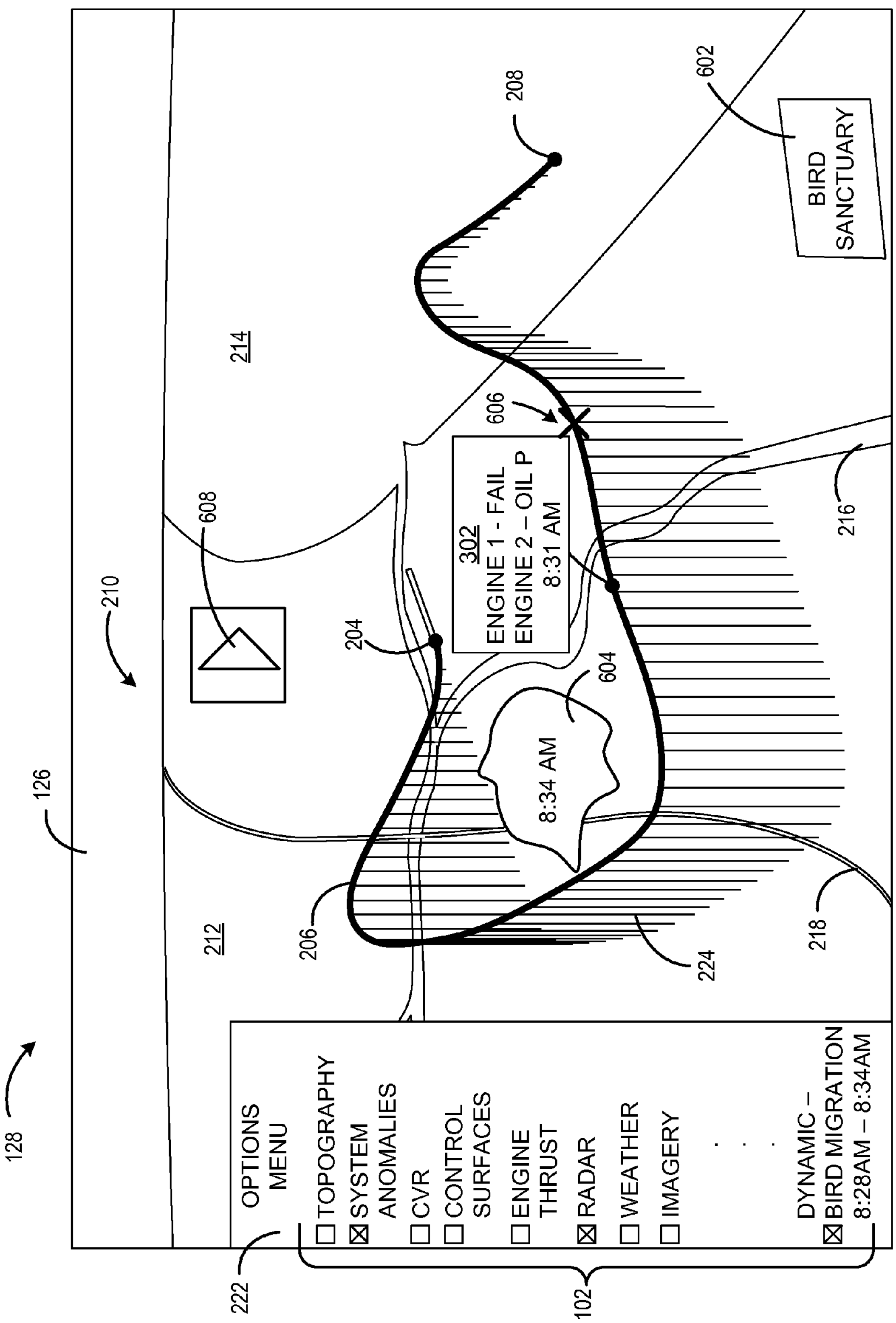

For example, turning to FIGS. 6A-6C, in order to further investigate the bird strike possibility, the investigation team 130 has incorporated a geographical identification of a bird sanctuary 602 located nearby, and have selected a radar option from the Options Menu 222 to include radar imagery from a nearby ground-based radar station of a large grouping of "noisy" radar signatures 604 that is speculated to be a large group of migratory birds. The investigation team 130 has also selected an option to display a dynamic visualization of a bird migration recorded by radar during a selected time period of 8:28 AM-8:34 AM. Accordingly, in FIG. 6A, the radar signature 604 is shown on at the precise location where it was recorded at 8:28 AM. The current location of the aircraft at 8:28 AM is represented along the flight path 206 by the aircraft location identifier 606.

Selection of a dynamic visualization option from the Options Menu 222 results in the display of a playback selector 608 that can be utilized to control playback of the dynamic visualization. Upon selection of the playback selector 608, the event data visualization application 120 initiates a dynamic rendering of the applicable flight event data parameters 102 and aircraft location during the selected time period, as represented by FIGS. 6A-6C. It should be appreciated that a large number of recorded event occurrences with corresponding time stamps may be utilized to provide a smooth, fluid rendering of the applicable time period. Alternatively, any number of recorded event occurrences may be utilized and known extrapolation techniques utilized to provide a smooth, fluid rendering of the applicable time period between recorded events. In yet another alternative embodiment, the dynamic visualization may "jump" between recorded event occurrences without providing a smooth, fluid playback.

Looking at FIGS. 6B and 6C, it can be seen that the location of the aircraft at identifier 606 at 8:31 AM, which corresponds to the recorded engine malfunctions, intersects the migration path of the group of birds as indicated by the radar signatures 604. It should be clear from this illustrative example of a dynamic visualization that any flight event data parameters 102, or groups of flight event data parameters 102, may be dynamically represented along with the aircraft location identifier 606 to further aid in the visualization of events leading to the aircraft incident. Moreover, still images from a dynamic visualization, or from any event visualization 128, may be captured, saved, printed, and/or exported to any other application to assist the investigation team 130 in report and presentation preparation.

The second recorded grouping is shown as radar signature 604 at the location where it was recorded at 8:34 AM. The time associated with the engine malfunction indicator 302 was added, which was at 8:31 AM. This visualization provides further evidence to the investigation team 130 that a migratory flock of birds crossed paths with the aircraft, potentially causing one or more birds to be ingested into the engines, which may have led to the loss of power and ultimate crash of the aircraft.

Figure 7:
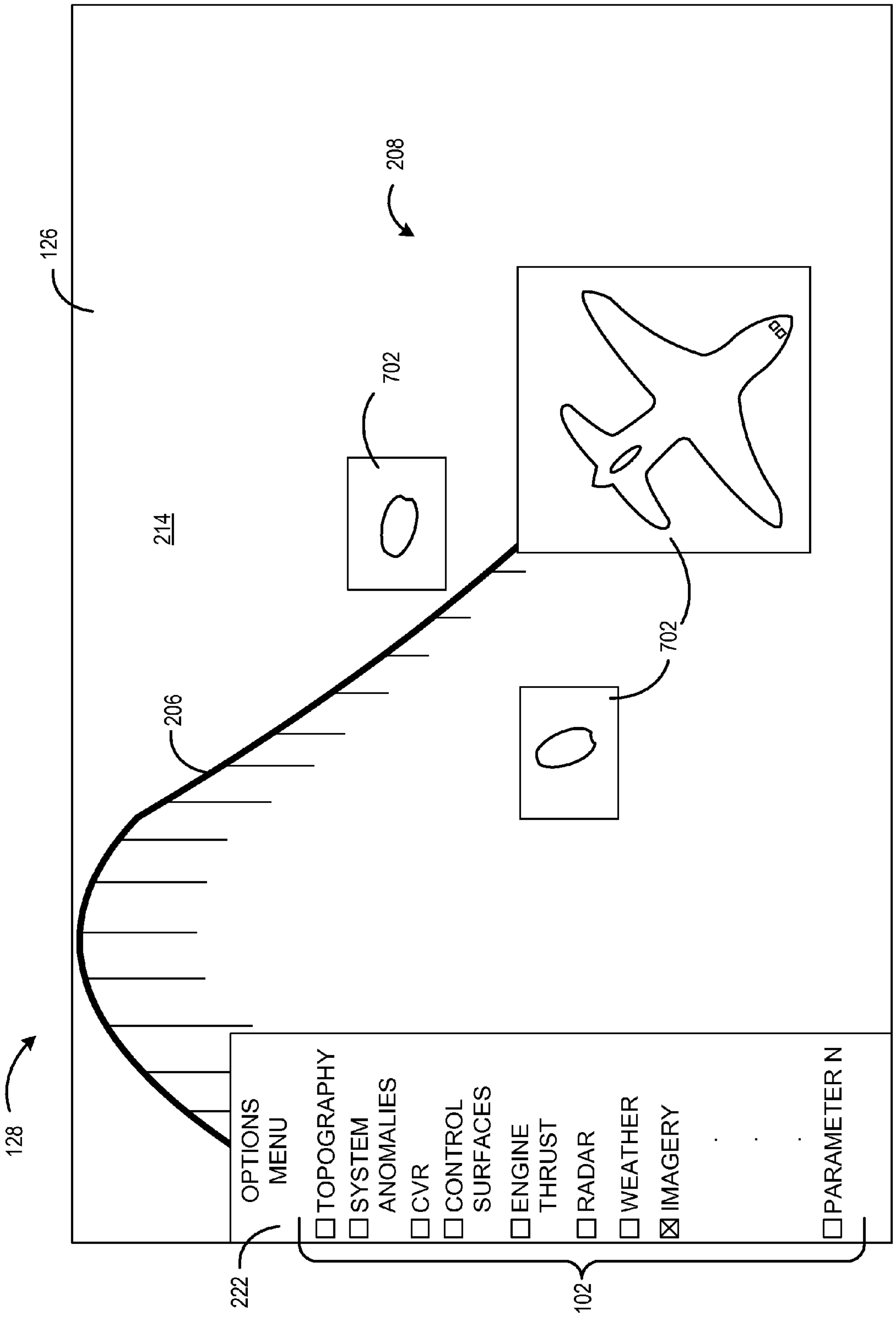
Figure 8:
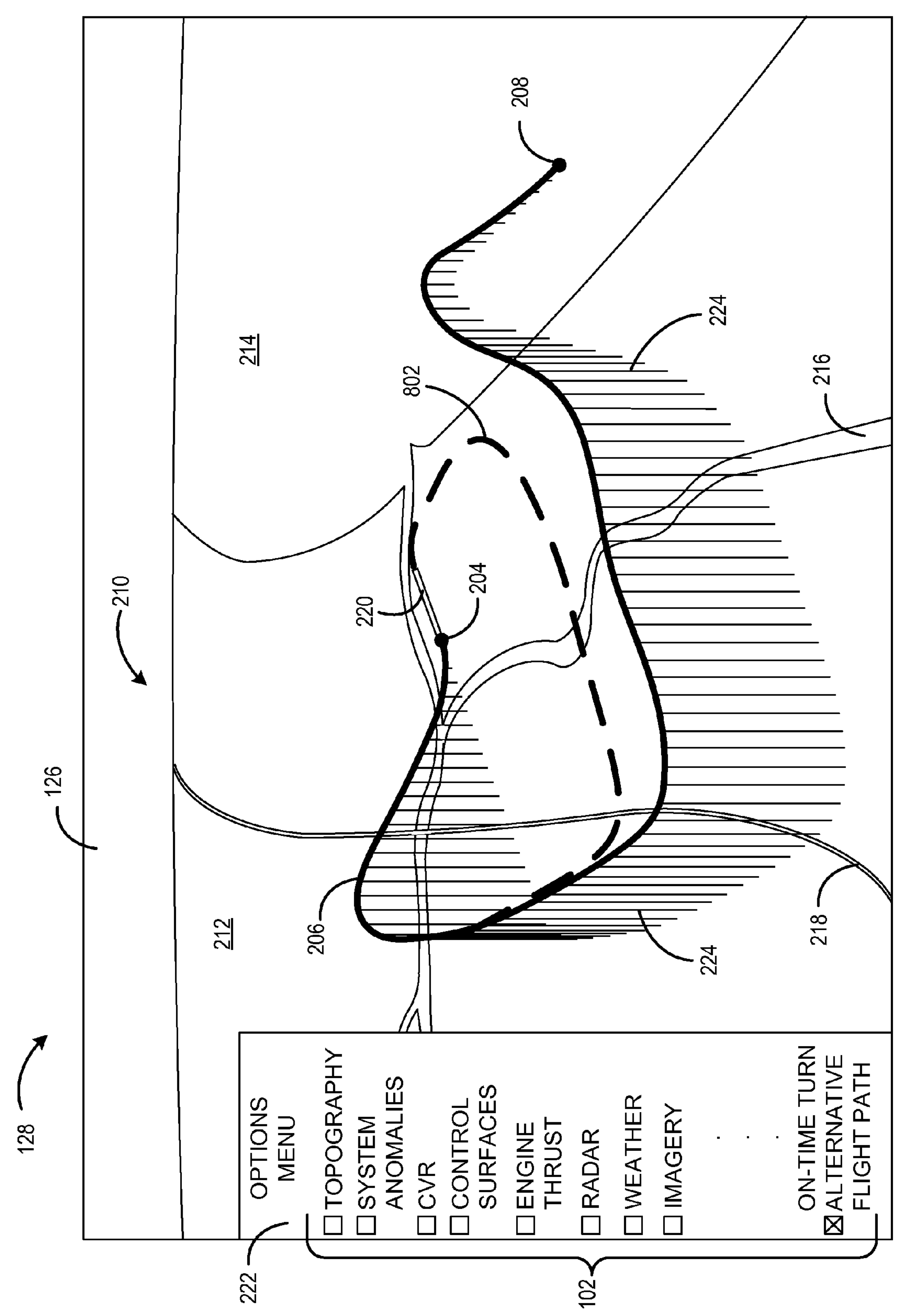

As mentioned above, according to various embodiments described herein, a user of the event visualization 128 has the capability to alter the viewing perspective of the event visualization 128 in a similar way as is done with a traditional mapping application such as GOOGLE mapping services. FIG. 7 shows a zoomed in portion of the event visualization 128 that shows the end of the flight path 206 at the location of the incident site 208. As seen, when the user zooms in to a particular level, the event data visualization application 120 provides images 702 of the actual debris field, for example showing photographs of the aircraft and the engines that separated from the aircraft upon contact with the ocean 214 during the controlled landing in the water. These images 702 may be photographs taken by the investigation team 130, satellite imagery, or images taken by any type of radar systems. When these images are selected using a mouse or other input device, the event data visualization application 120 may retrieve and display a higher resolution image corresponding to the image 702 selected.

A further embodiment of the aircraft flight event data integration and visualization system 100 allows the investigation team 130 to provide alternative flight event data parameters 102, and will provide an alternative flight path that represents the flight path that the aircraft could have taken if all other flight event data parameters 102 remained the same in light of the newly provided alternative parameter. For example, looking at FIG. 8, assume that data from the incident investigation shows that the aircraft made the second right turn after takeoff late. As a result, the aircraft was farther away from the airport 220 when the suspected bird strike occurred than it should have been had it complied completely with the directions given by air traffic controllers.

The investigation team could input alternative flight event data parameters 102 and/or alternative aircraft location data 105 that indicates that the aircraft turned at the precise geographic coordinates as instructed by air traffic control. This alternative flight path 802 is shown on the event visualization 128 as a broken line. Now assuming that a bird strike occurs at the same location along the alternative flight path 802 leg as it did on the actual flight path 206 leg, and at the same altitude, heading, and airspeed, the event data visualization application 120 can determine whether the aircraft could have made it back to the airport 220 given the same engine thrust asymmetry and other problems experienced by the aircraft. As seen by the broken line depiction of the alternative flight path 802, it can be determined that the aircraft could have returned to the airport 220 for an emergency landing had the aircraft performed the second turn on time.

It should be understood that there is a potentially limitless quantity and type of flight data that can be utilized as parameters that can be transformed into visual representations on an event visualization 128 according to the various embodiments described herein. These embodiments allow for time-based events that are recorded by any number of flight event data sources 103 to be correlated with a geographic location by associating the events with the location corresponding to the time at which the event occurred using the aircraft location data. By selectively plotting these events with a flight path 206 on a map or geographical representation 210 of the applicable area, the investigation team 130 has an invaluable tool that enables them to quickly process incident investigation data and recognize cause and effect relationships between various parameters to aid in determining the cause of an incident.

It should also be understood that the representation of the flight event data parameters 102 on the geographic representation 210 of the applicable area can be effectuated utilizing any known and applicable programming language. For example, in utilizing GOOGLE mapping services as the underlying geographic representation 210 of the applicable area on which the flight path 206 and desired flight event data parameters 102 are to be plotted, a member of the investigation team 130 can program the event data visualization application 120 utilizing keyhole markup language (KML) to define where to plot representations, what color to use, what icon should be used, etc. The event data visualization application 120 can be programmed to convert the applicable data to KML code, or programs such as MICROSOFT EXCEL from Microsoft Corporation can be used to convert the data to KML.

Figure 9:
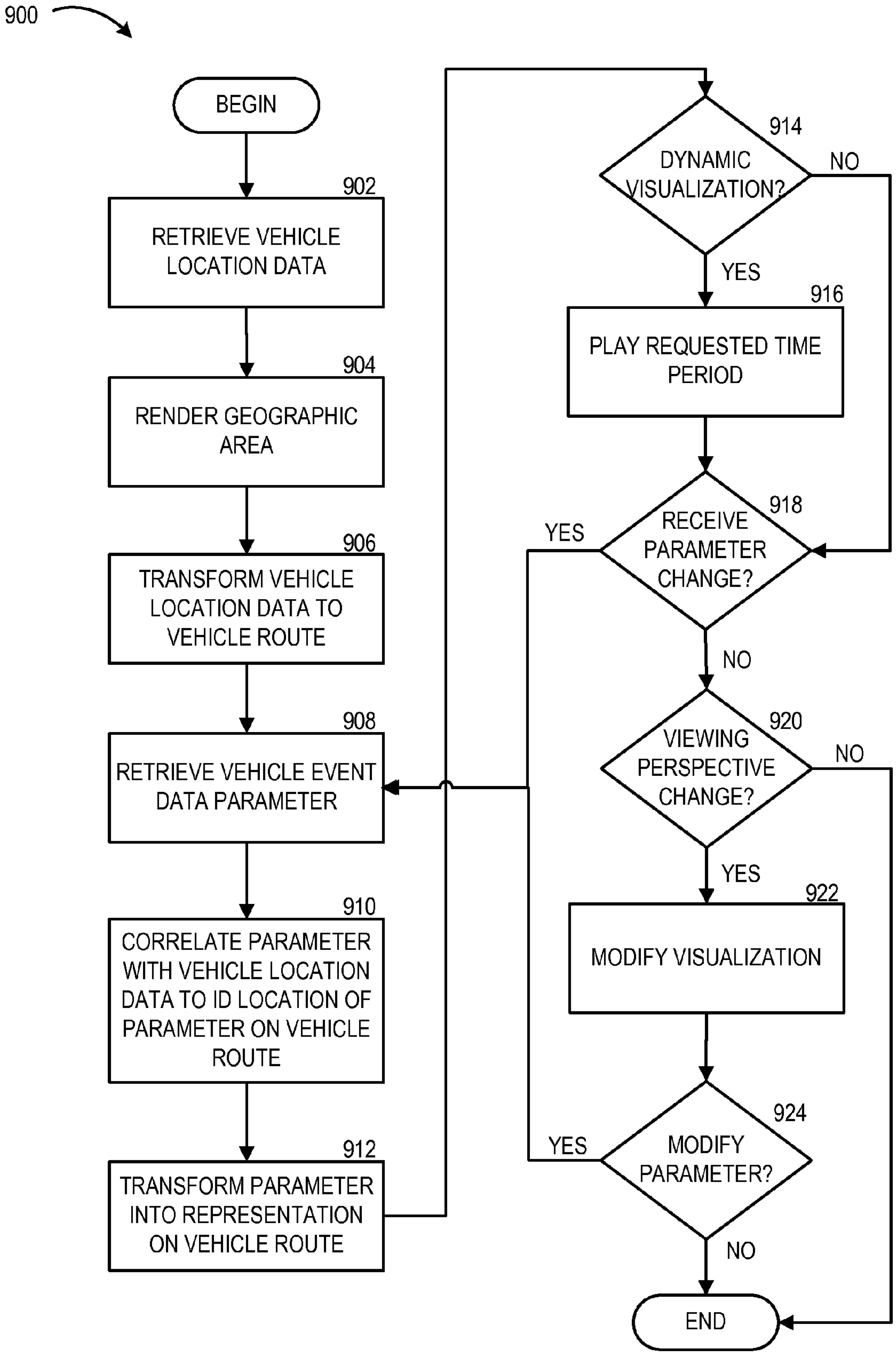
FIG. 9 is a flow diagram showing a method for providing flight event data integration and visualization according to various embodiments presented herein.

Turning now to FIG. 9, an illustrative routine 900 for providing aircraft flight event data integration and visualization will now be described in detail. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 900 begins at operation 902, where the event data visualization application 120 retrieves the aircraft location data 105. As described above, the aircraft location data 105 may originate from a GPS or inertial device and be stored within the FDR 104 or other location. Alternatively, this location data, and all other flight event data parameters 102 may have been extracted from the applicable flight event data sources 103 by the investigation team 130 and stored within a database or other repository for retrieval by the event data visualization application 120. From operation 902, the routine 900 continues to operation 904, where the event data visualization application 120 and/or mapping application 124 renders the appropriate geographic representation 210 corresponding to the area of the flight path 206 and incident site 208 using applicable geography data 125.

The routine 900 continues to operation 906, where the event data visualization application 120 transforms the aircraft location data 105 to a flight path 206. A first flight event data parameter 102 is retrieved at operation 908 and is correlated with the aircraft location data 105 at operation 910 to identify the location of the event on the flight path 206. From operation 910, the routine 900 continues to operation 912, where a representation of the flight event data parameter 102 is rendered on the flight path 206 on the event visualization 128 according to user-selected options from an Options Menu 222 or other event visualization setup or customization mechanism.

The routine 900 continues from operation 912 to operation 914, where a determination is made as to whether a dynamic visualization, such as that shown and described with respect to FIGS. 6A-6C, has been requested. This request may be made via the Options Menu 222 according to one embodiment as described above. If a dynamic visualization has not been requested, then the routine 900 proceeds to operation 918 and continues as described below. However, if a dynamic visualization has been requested, then the event data visualization application 120 provides the visualization at operation 916 and plays the visualization for the requested period of time.

The routine 900 continues from operation 916 to operation 918, where a determination is made whether a parameter change has been received. For example, if a user selects or deselects a flight event data parameter option from the Options Menu 222, then a parameter change is received by the event data visualization application 120. If a parameter change is received, then the routine 900 returns to operation 908 and continues as described above. However, if a parameter change is not received, then the routine 900 continues to operation 920, where a determination is made as to whether a user has requested a change to the viewing perspective. As described above, a user may take advantage of the zooming and other viewing perspective shifts and modifications provided by the mapping application 124. In doing so, one or more flight event data parameters 102 may need to be modified according to programmed instructions, such as adding additional information to a representation when zooming to allow more viewing space on the display screen.

If the user has not requested a change to the viewing perspective at operation 920, then the routine 900 ends. However, if the user has requested a change to the viewing perspective, then the routine 900 proceeds to operation 922, where the event visualization 128 is modified accordingly. At operation 924, a determination is made as to whether one or more flight event data parameters 102 are to be modified as described above in response to the zooming or other viewing perspective modifications. If parameter modifications are required, then the routine 900 returns to operation 908 and continues as described above. However, if no parameter modification is required at operation 924, then the routine 900 ends.

Figure 10:
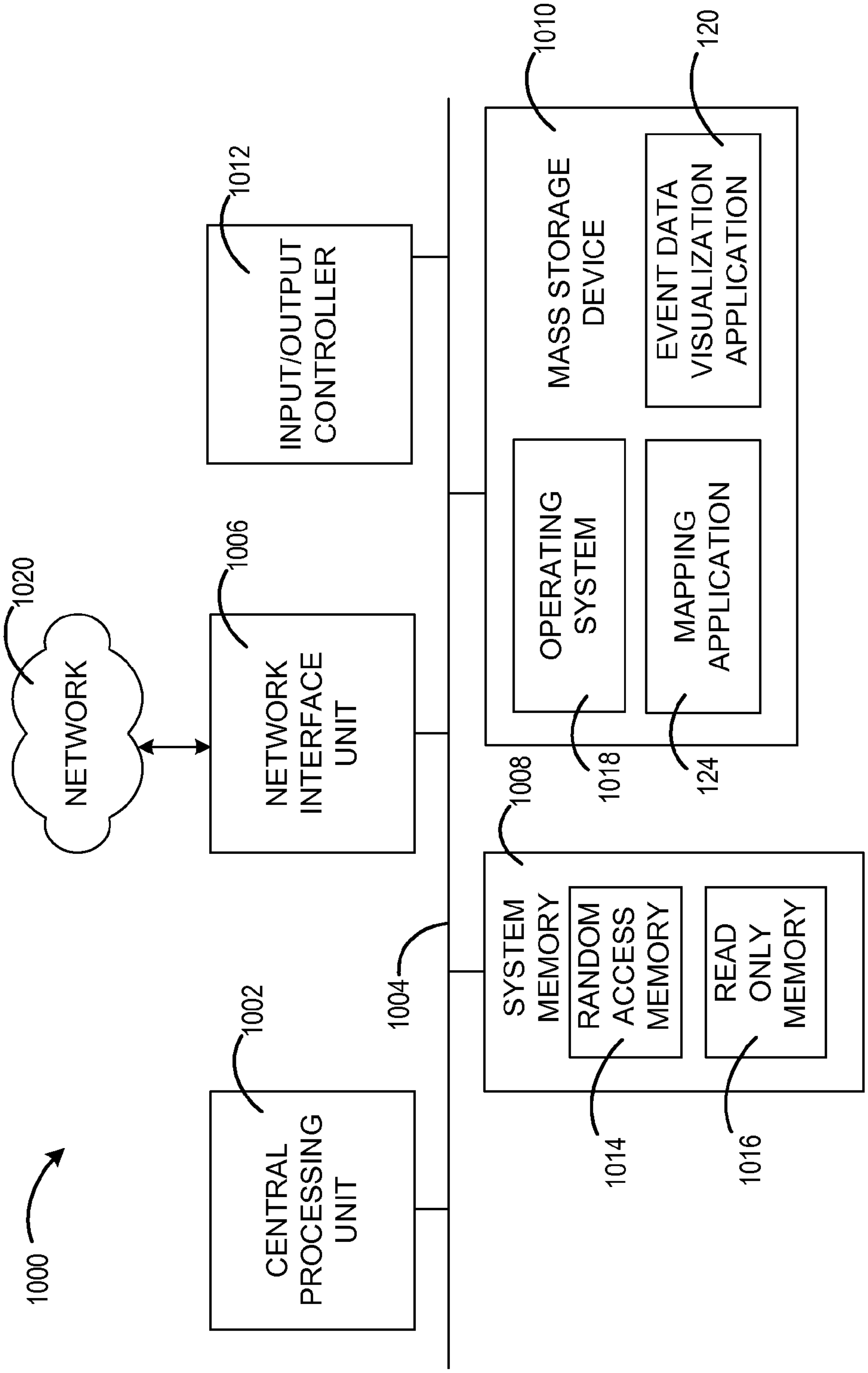
FIG. 10 is a computer architecture diagram showing an illustrative computer hardware and software architecture for a computing system capable of implementing aspects of the embodiments presented herein.

FIG. 10 shows an illustrative computer architecture for a computer 1000 capable of executing the software components described herein. The computer architecture shown in FIG. 10 illustrates a conventional desktop, laptop, or server computer and may be utilized to execute any aspects of the software components presented herein.

The computer architecture shown in FIG. 10 includes a central processing unit 1002 (CPU), a system memory 1008, including a random access memory 1014 (RAM) and a read-only memory (ROM) 1016, and a system bus 1004 that couples the memory to the CPU 1002. A basic input/output system containing the basic routines that help to transfer information between elements within the computer 1000, such as during startup, is stored in the ROM 1016. The computer 1000 further includes a mass storage device 1010 for storing an operating system 1018, application programs, and other program modules, which are described in greater detail herein.

The mass storage device 1010 is connected to the CPU 1002 through a mass storage controller (not shown) connected to the bus 1004. The mass storage device 1010 and its associated computer readable storage media provide non-volatile storage for the computer 1000. Although the description of computer readable storage media contained herein refers to a mass storage device, such as a hard disk or CD-ROM drive, it should be appreciated by those skilled in the art that computer storage media can be any available computer storage media that can be accessed by the computer 1000.

By way of example, and not limitation, computer readable storage media may include volatile and non-volatile, removable and non-removable media implemented in any method or technology for storage of information such as computer readable and executable instructions, data structures, program modules or other data. For example, computer storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 1000.

According to various embodiments, the computer 1000 may operate in a networked environment using logical connections to remote computers through a network such as the network 1020. The computer 1000 may connect to the network 1020 through a network interface unit 1006 connected to the bus 1004. It should be appreciated that the network interface unit 1006 may also be utilized to connect to other types of networks and remote computer systems. The computer 1000 may also include an input/output controller 1012 for receiving and processing input from a number of other devices, including a keyboard, mouse, or electronic stylus (not shown in FIG. 10). Similarly, an input/output controller may provide output to a display 126, a printer, or other type of output device.

As mentioned briefly above, a number of program modules and data files may be stored in the mass storage device 1010 and RAM 1014 of the computer 1000, including an operating system 1018 suitable for controlling the operation of a networked desktop, laptop, or server computer. The mass storage device 1010 and RAM 1014 may also store one or more program modules. In particular, the mass storage device 1010 and the RAM 1014 may store the event data visualization application 120 and the mapping application 124, each of which was described in detail above with respect to FIGS. 1-9. The mass storage device 1010 and the RAM 1014 may also store other types of program modules and data.

It should be appreciated that the software components described herein may, when loaded into the CPU 1002 and executed, transform the CPU 1002 and the overall computer 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules and data presented herein might also transform the physical structure of the computer storage media presented herein. The specific transformation of physical structure may depend on various factors, in different implementations of this description. Examples of such factors may include, but are not limited to: the technology used to implement the computer storage media, whether the computer storage media is characterized as primary or secondary storage, and the like. For example, if the computer storage media is implemented as semiconductor-based memory, the software disclosed herein may be encoded on the computer readable storage media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It also should be appreciated that the computer 1000 may comprise other types of computing devices, including hand-held computers, embedded computer systems, personal digital assistants, and other types of computing devices known to those skilled in the art. It is also contemplated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for aircraft flight event data integration and visualization have been disclosed herein. Although the subject matter presented herein has been described in language specific to computer structural features, methodological and transformative acts, specific computing machinery, and computer storage media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for providing event visualization, the computer-implemented method comprising computer-implemented operations for:

retrieving stored aircraft location data associated with a plurality of time instances during an aircraft flight;

providing a rendering of a geographic area that encompasses the aircraft location data;

transforming the aircraft location data into a three dimensional representation of the flight path on the rendering of the geographic area;

retrieving a flight event data parameter corresponding to at least one event occurrence during the aircraft flight;

correlating the flight event data parameter with the aircraft location data to identify a geographic location of the flight event data parameter along the flight path; and transforming the flight event data parameter into a representation of the at least one event occurrence on the representation of the flight path.

2. The computer-implemented method of claim 1, wherein the aircraft location data comprises latitudinal coordinates, longitudinal coordinates, and altitude data, and wherein the representation of the flight path comprises a plurality of altitude indicators representing an altitude of an aircraft at a plurality of locations on the flight path.

3. The computer-implemented method of claim 1, wherein correlating the flight event data parameter with the aircraft location data to identify the geographic location of the flight event data parameter along the flight path comprises correlating a time instance of a flight event associated with the flight event data parameter to the geographical location of an aircraft at the time instance according to the aircraft location data.

4. The computer-implemented method of claim 1, wherein the stored aircraft location data associated with the plurality of time instances during the flight path comprises global positioning system (GPS) or inertial data stored within a flight data recorder (FDR).

5. The computer-implemented method of claim 1, wherein the event visualization comprises a dynamic visualization such that a plurality of event occurrences of the flight event data parameter are fluidly displayed at the plurality of time instances.

6. The computer-implemented method of claim 1, further comprising:

receiving a request to alter a zoom view of the flight path; and in response to the request to alter the zoom view of the flight path, rendering a view of the flight path and corresponding geographic area according to a requested zoom level, and altering at least one representation of a flight event data parameter.

7. The computer-implemented method of claim 6, wherein altering the at least one representation of a flight event data parameter comprises displaying imagery of an incident area rendered at a location on the geographic area corresponding to a geographic location of the incident area.

8. The computer-implemented method of claim 1, further comprising:

receiving a request to visualize a second flight event data parameter;

in response to the request, retrieving the second flight event data parameter corresponding to at least one event occurrence during the flight path;

correlating the second flight event data parameter with the aircraft location data to identify a geographic location of the second flight event data parameter along the flight path; and transforming the second flight event data parameter into a representation of the at least one event occurrence on the representation of the flight path such that the flight event data parameter and the second flight event data parameter are visually distinguishable.

9. The computer-implemented method of claim 1, further comprising:

receiving a alternative flight event data parameter;

receiving a plurality of flight event data parameters;

correlating the alternative flight event data parameter with the plurality of flight event data parameters to create alternative aircraft location data associated with the plurality of time instances during the aircraft flight; and transforming the alternative aircraft location data into a representation of a alternative flight path on the rendering of the geographic area.

10. A computer system for providing event visualization, comprising:

a processor;

a memory operatively coupled to the processor; and a program module which executes in the processor from the memory and which, when executed by the processor, causes the computer system to create a flight event visualization by retrieving aircraft location data corresponding to a plurality of time instances associated with an aircraft flight, retrieving geography data corresponding to a geographic area that encompasses the aircraft location data, transforming the aircraft location data and the geography data into a visual representation of a three dimensional flight path overlaid onto a map of the geographic area, retrieving a plurality of flight event data parameters, each corresponding to at least one event occurrence during the aircraft flight, correlating the plurality of flight event data parameters with the aircraft location data to identify a geographic location of each flight event data parameter along the flight path, and transforming each of the flight event data parameters into a representation of the at least one event occurrence on the representation of the flight path.

11. The computer system of claim 10, wherein the aircraft location data comprises latitudinal coordinates, longitudinal coordinates, and altitude data, and wherein the representation of the flight path comprises a plurality of altitude indicators representing an altitude of an aircraft at a plurality of locations on the flight path.

12. The computer system of claim 10, wherein correlating the flight event data parameter with the aircraft location data to identify the geographic location of the flight event data parameter along the flight path comprises correlating a time instance of a flight event associated with the flight event data parameter to the geographical location of an aircraft at the time instance according to the aircraft location data.

13. The computer system of claim 10, wherein the aircraft location data associated with the plurality of time instances during the aircraft flight comprises GPS or inertial data stored within a flight data recorder ("FDR").

14. The computer system of claim 10, wherein providing the rendering of the geographic area that encompasses the aircraft location data comprises instructing a mapping application to render the geographic area corresponding to the aircraft location data.

15. The computer system of claim 10, wherein the program module, when executed by the processor, further causes the computer system to create a flight event visualization by:

receiving a request to alter a zoom view of the flight path; and in response to the request to alter the zoom view of the flight path, rendering a view of the flight path and corresponding geographic area according to a requested zoom level, and altering at least one representation of a flight event data parameter.

16. The computer system of claim 10, wherein the program module, when executed by the processor, further causes the computer system to create a flight event visualization by:

receiving a request to visualize a second flight event data parameter;

in response to the request, retrieving the second flight event data parameter corresponding to at least one event occurrence during the aircraft flight;

correlating the second flight event data parameter with the aircraft location data to identify a geographic location of the second flight event data parameter along the flight path; and transforming the second flight event data parameter into a representation of the at least one event occurrence on the representation of the flight path such that the flight event data parameter and the second flight event data parameter are visually distinguishable.

17. A computer readable storage medium having computer-executable instructions stored thereon which, when executed by a computer, cause the computer to:

retrieve aircraft location data associated with a plurality of time instances during an aircraft flight;

provide a rendering of a geographic area that encompasses the aircraft location data;

transform the aircraft location data into a three dimensional representation of an aircraft flight path on the rendering of the geographic area;

retrieve a flight event data parameter corresponding to a system anomaly during the aircraft flight;

correlate the flight event data parameter with the aircraft location data to identify a geographic location of the flight event data parameter along the aircraft flight path; and transform the flight event data parameter into a representation of the system anomaly on the representation of the aircraft flight path.

18. The computer readable storage medium of claim 17, wherein the aircraft location data comprises latitudinal coordinates, longitudinal coordinates, and altitude data, and wherein the representation of the aircraft flight path comprises a plurality of altitude indicators representing an altitude of an aircraft at a plurality of locations on the aircraft flight path.

19. The computer readable storage medium of claim 17, further comprising computer-executable instructions stored thereon which, when executed by the computer, cause the computer to:

receive a request to visualize a second flight event data parameter;

in response to the request, retrieve the second flight event data parameter corresponding to at least one event occurrence during the aircraft flight;

correlate the second flight event data parameter with the aircraft location data to identify a geographic location of the second flight event data parameter along the aircraft flight path; and transforming the second flight event data parameter into a representation of the at least one event occurrence on the representation of the aircraft flight path such that the flight event data parameter and the second flight event data parameter are visually distinguishable.

20. The computer readable storage medium of claim 17, further comprising computer-executable instructions stored thereon which, when executed by the computer, cause the computer to:

receive a alternative flight event data parameter;

receive a plurality of flight event data parameters;

correlate the alternative flight event data parameter with the plurality of flight event data parameters to create alternative aircraft location data associated with the plurality of time instances during the aircraft flight; and transform the alternative aircraft location data into a representation of a alternative aircraft flight path on the rendering of the geographic area.

* * * * *